No. 656,738. Patented Aug. 28, 1900.
A. J. BRANHAM.
COMBINED HOBBY HORSE AND INVALID'S CHAIR.
(Application filed Nov. 21, 1899.)
(No Model.) 2 Sheets—Sheet 1.
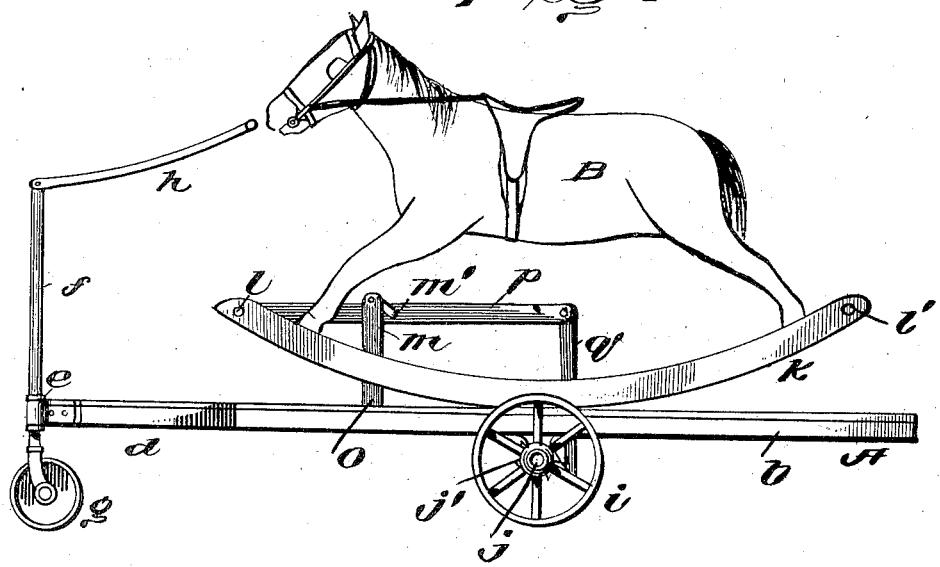
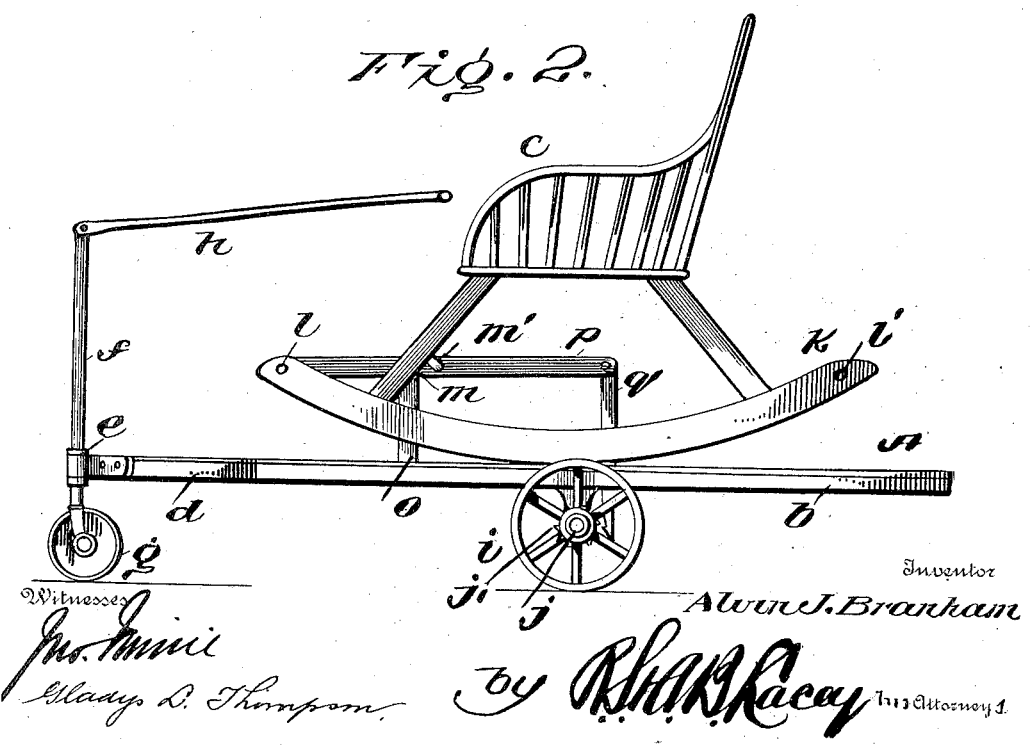

No. 656,738. Patented Aug. 28, 1900.
A. J. BRANHAM.
COMBINED HOBBY HORSE AND INVALID'S CHAIR.
(Application filed Nov. 21, 1899.)
(No Model.) 2 Sheets—Sheet 2.
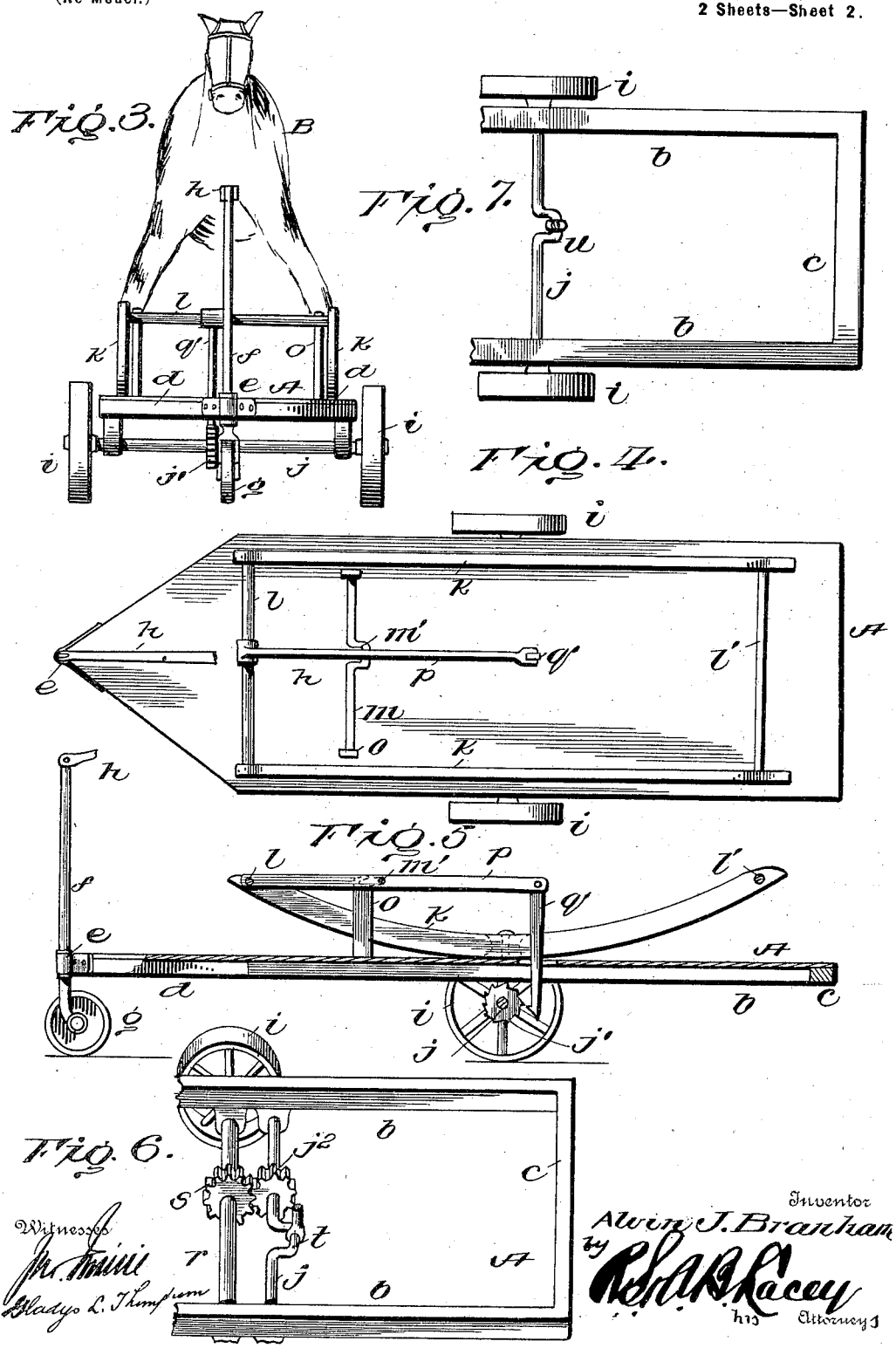

UNITED STATES PATENT OFFICE.

ALVIN J. BRANHAM, OF SPRINGFIELD, MISSOURI.

COMBINED HOBBY-HORSE AND INVALID'S CHAIR.

SPECIFICATION forming part of Letters Patent No. 656,738, dated August 28, 1900.

Application filed November 21, 1899. Serial No. 737,786. (No model.)

*To all whom it may concern:*

Be it known that I, ALVIN J. BRANHAM, a citizen of the United States, residing at Springfield, in the county of Greene and State of Missouri, have invented certain new and useful Improvements in a Combined Hobby-Horse and Invalid's Chair; and I do hereby declare the following to be a full, clear, and exact description of the invention, such as will enable others skilled in the art to which it appertains to make and use the same.

My invention relates to improvements in wheeled vehicles for the use of children and invalids, the object being to provide a simple and novel construction of vehicle embodying a wheeled frame or carriage carrying a hobby-horse, invalid's rocking-chair, or an analogous rocking device, with mechanism operated by the rocking motion thereof to propel the vehicle.

To this end the invention consists of certain novel features of construction, combination, and arrangement of parts, which will be hereinafter more fully described, and particularly pointed out in the appended claims.

In the accompanying drawings the same reference characters indicate the same parts of the invention throughout the several views.

Figure 1 is a side elevational view of a vehicle embodying my invention, showing the rocking device in the form of a hobby-horse. Fig. 2 is a similar view showing a rocking-chair substituted for the hobby-horse to adapt the device for use by invalids. Fig. 3 is a front view of the vehicle as constructed in Fig. 1. Fig. 4 is a top plan view with the hobby-horse removed. Fig. 5 is a vertical longitudinal section of the same. Figs. 6 and 7 are perspective views showing modified forms of gearing.

Referring now more particularly to the drawings, A represents a wheeled carriage or frame, which may be of any approved construction, but, as shown, consists of two parallel side bars or beams $b$, connected at suitable intervals by transverse brace-rods $c$ and at the front by two forwardly-extending convergent arms $d$, carrying at their outer ends a steering-head $e$. Mounted in this head is a shaft or spindle $f$, carrying at its lower end a steering-wheel $g$ and at its upper end a rearwardly-projecting hand-lever $h$, by which the shaft and wheel may be turned to steer the vehicle. The frame is mounted upon wheels $i$, rigidly secured to the ends of a rotating drive-shaft $j$, extending transversely across the frame and journaled therein. A platform of wood or metal is preferably secured to the upper surface of the frame, as shown, and mounted upon this platform are rockers $k$, which are connected and braced at their ends by transverse rods $l$ and $l'$. On these rockers any preferred form of seat may be mounted, according to the use to which the vehicle is to be put. If it is desired to provide a hobby-horse construction for the amusement of children, the figure of a horse or other animal (denoted by the letter B) may be applied to the rockers, as shown in Fig. 1, or if it is desired to provide a vehicle in which the rider or occupant may sit and repose comfortably and also propel the vehicle from place to place at leisure a seat C may be used. The vehicle may be thus adapted to serve as an easy and comfortable invalid's chair which may be propelled by the occupant without undue exertion and whenever desired.

The mechanism for communicating motion from the rockers to the drive-shaft $j$ comprises a rock-shaft $m$, mounted to oscillate in bearings upon the upper ends of standards $o$, rising from the bars or beams $b$, and having an offset or crank portion $m'$. To this crank portion is centrally connected a rocking arm or lever $p$, pivoted at one end to the front transverse brace $l$ of the rockers and carrying at its opposite end a depending pawl or rack-bar $q$, adapted to engage a ratchet-wheel $j'$, fixed upon the shaft $j$. From this construction it will be seen that as the rockers move up and down the lever $p$ will rock in a vertical plane upon its fulcrum (the shaft $m$) and in so doing will vertically reciprocate the rack-bar, which in its upward movement will turn the gear $j'$ and shaft $j$, and thus propel the vehicle forwardly. The function of the crank portion of the rock-shaft $m$ is to form a shifting fulcrum for the lever $p$ to allow the latter to have limited longitudinal play to compensate for the variations in position due to the up-and-down movements of the front ends of the rockers. When the front ends of the rockers move downward, it will be apparent that the arc described will require a limited forward movement of the lever and that, on the contrary, a reverse or backward movement of the lever is necessary when the rockers move upward. This change in position is effected through the action of the crank portion $m'$ of the shaft $m$, which crank portion oscillates or swings back and forth upon the up-and-down movements of the forward ends of the rockers. It will also be apparent that as the rear end of the lever moves upwardly the lower toothed end of the rack-bar will move forward and upward and engage and turn the ratchet-wheel and that a reverse movement of the rack-bar will take place when the said rear end of the lever moves downward.

The gearing may be modified, as shown in Figs. 6 and 7, without departing from the spirit of the invention. In Fig. 6 a counter-shaft $r$ is journaled in the side bars $b$ and carries a pinion $s$, which meshes with a cog-gear $j^2$ on the shaft $j$. The counter-shaft is also provided with a crank portion $t$, to which the rocking arm $p$ is operatively connected. In Fig. 7 the counter-shaft and gear on the drive-shaft are dispensed with, and in lieu thereof said drive-shaft is formed with a crank portion $u$, with which the rocking arm is operatively connected. The operation with these constructions will be apparent.

It is to be understood that the term "rocker" employed in the claims is intended to include any preferred form of rocking device constructed as herein shown or otherwise.

The drive mechanism may be duplicated at the rear of the device, if desired.

Having thus described the invention, what is claimed as new is—

1. A wheeled vehicle of the character described, having, in combination, a frame or carriage, a drive-shaft journaled therein and carrying drive-wheels, a rocker mounted on the frame, a rock-shaft also mounted on the frame and having a crank portion, a rocking lever connected at its front end to the rocker and mounted centrally upon said crank portion of the rock-shaft which forms a shifting fulcrum therefor, and connections between the rear end of the lever and drive-shaft for communicating motion to the latter, substantially as described.

2. A wheeled vehicle of the character described, having, in combination, a frame or carriage, a drive-shaft journaled therein and carrying drive-wheels and a gear, a rocker mounted on the frame, a rock-shaft also mounted on the frame and having a crank portion, a rocking lever connected at its front end to the rocker and mounted centrally upon said crank portion of the rock-shaft which forms a shifting fulcrum therefor, and a rack-bar pivoted at its upper end to the rear end of the lever and having its lower end adapted to engage and operate said gear, substantially as described.

In testimony whereof I affix my signature in presence of two witnesses.

ALVIN J. BRANHAM. [L. S.]

Witnesses:
WM. DONER,
MAYME COFFEY.